(12) United States Patent
Park

(10) Patent No.: US 6,862,055 B2
(45) Date of Patent: Mar. 1, 2005

(54) LIQUID CRYSTAL DISPLAY DEVICE AND METHOD FOR FABRICATING THE SAME

(75) Inventor: Dug-Jin Park, Taeku (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/407,244

(22) Filed: Apr. 7, 2003

(65) Prior Publication Data

US 2003/0202132 A1 Oct. 30, 2003

Related U.S. Application Data

(62) Division of application No. 09/629,794, filed on Jul. 31, 2000, now Pat. No. 6,567,135.

(30) Foreign Application Priority Data

Jul. 31, 1999 (KR) .......................................... 1999-31487

(51) Int. Cl.$^7$ ..................... G02F 1/1333; G02F 1/1343; G02F 1/1345
(52) U.S. Cl. ........................ 349/110; 349/139; 349/149
(58) Field of Search ................................. 349/110, 139, 349/149, 152

(56) References Cited

U.S. PATENT DOCUMENTS 5,730,880 A * 3/1998 Gerber et al. ............... 349/110
6,545,731 B2 * 4/2003 Melnik et al.

FOREIGN PATENT DOCUMENTS

JP 7104281 * 4/1996

* cited by examiner

Primary Examiner—Tarifur R. Chowdhury
Assistant Examiner—Hoan C. Nguyen
(74) Attorney, Agent, or Firm—McKenna Long & Aldridge LLP

(57) ABSTRACT

The present invention discloses a method of manufacturing a liquid crystal display device, including depositing a first metal layer on a transparent substrate; patterning the metal layer to form a gate line, the gate line having a gate electrode portion; depositing sequentially an insulating layer, an amorphous silicon layer and a doped amorphous silicon layer on the exposed surface of the transparent substrate while covering the gate line; patterning the amorphous silicon layer and the doped amorphous silicon layer to form a semiconductor island; depositing a second metal layer on the exposed surface of the insulating layer while covering the semiconductor island; patterning the second metal layer to form a source electrode, a drain electrode, and a capacitor electrode, the drain electrode spaced apart from the source electrode; etching the doped amorphous silicon layer of the semiconductor island to from an active area; forming a passivation film over the whole surface of the substrate while covering the source electrode, the drain electrode and the capacitor electrode; depositing a transparent conductive material layer on the passivation film; applying a negative photoresist on the transparent conductive material layer; performing a back side exposure to form a first exposed portion of the negative photoresist; aligning a patterning mask with the negative photoresist; performing a front side exposure to form a second exposed portion of the negative photoresist, the second exposed portion overlapping the first exposed portion; baking the transparent conductive material layer; and patterning the transparent conductive material layer to form a pixel electrode.

5 Claims, 9 Drawing Sheets light irradiation

LIQUID CRYSTAL DISPLAY DEVICE AND METHOD FOR FABRICATING THE SAME

This application is a divisional of U.S. patent application Ser. No. 09/629,794 filed on Jul. 31, 2000 now U.S. Pat. No. 6,567,135.

CROSS REFERENCE

This application claims the benefit of Korean Patent Application No. 1999-31487, filed on Jul. 31, 1999, under 35 U.S.C. § 119, the entirety of which is hereby incorporated by reference.

BACKGROUND OF THE INVENTION

1. Field of the Invention

The present invention relates to a liquid crystal display (LCD) device, and more particularly, to a liquid crystal display device having a thin film transistor (TFT) and a method of manufacturing the same.

2. Description of Related Art

A typical liquid crystal display device uses optical anisotropy and polarization properties of liquid crystal molecules. The liquid crystal molecules have a definite orientational order in arrangement resulting from their thin and long shapes. The arrangement direction of the liquid crystal molecules can be controlled by supplying an electric field to the liquid crystal molecules. In other words, as the arrangement direction of the liquid crystal molecules is changed, the arrangement of the liquid crystal molecules also changes. Since Incident light is refracted to the arrangement direction of the liquid crystal molecules due to the optical anisotropy of the arranged liquid crystal molecules image data can be displayed.

By now, an active matrix LCD that the thin film transistors and the pixel electrodes are arranged in the form of a matrix is most attention-getting due to its high resolution and superiority in displaying moving video data.

FIG. 1 is a cross-sectional view illustrating a pixel of a conventional liquid crystal display device.

The liquid crystal display device 20 has a bottom substrate 2 and a top substrate 4 spaced apart from each other. The liquid crystal display device further includes a liquid crystal layer 10 is injected between the two opposite substrates 2 and 4. The top substrate 4 has a color filter to display colors, and the bottom substrate 2 has switching elements such as thin film transistors (TFTs) that applies electrical signals to the liquid crystal layer 10 to change the arrangement direction of the liquid crystal molecules of the liquid crystal layer 10. Each of the TFTs "S" has a gate electrode 30, a source electrode 32 and a drain electrode 34.

In detail, the top substrate 4 further includes a common electrode 12 covering the color filter layer 8. The common electrode 12 plays a role of the first electrode to supply a voltage to the liquid crystal layer 10. The bottom substrate 2 further includes a pixel electrode 14. The pixel electrode 14 is electrically connected with the drain electrode 34 of the TFT "S". The pixel electrode 14 receives electrical signals from the thin film transistor "S", and plays a role of the second electrode to supply voltage to the liquid crystal layer 10. A portion, on which the pixel electrodes 14 are formed, is defined as a pixel electrode portion "P". In order to prevent leakage of the liquid crystal layer 10 disposed between the top substrate 4 and the bottom substrate 2, edge portions of the top substrate 4 and the bottom substrate 2 are sealed by a sealant 6.

Recently, as the display area of the liquid crystal display device becomes larger, the fabricating process of the bottom substrate 2 becomes complicated. That is to say, for a liquid crystal display device having over 12 inch display area, a step-and-repeat exposure technique is applied to fabricating the bottom substrate. The step-and-repeat exposure technique is to perform at least two exposing steps with the same patterned mask. The reason for the step and repeat technique to be applicable to the bottom substrate is that the patterns formed on the bottom substrate are repeats of the same form.

Referring to the FIGS. 2 and 3, a batch exposure technique and the step-and-repeat exposure technique are explained as follows. Referring to the FIG. 2 showing a patterning mask, in the batch exposure technique, a display area A, data pad portions D and E and gate pad portions B and C surrounding the display area "A" are formed at one time with the patterning mask.

The batch exposure technique is just applicable to the bottom substrate of the liquid crystal display device having a less than 10 inch-sized display area. Namely, in case of the bottom substrate of the liquid crystal display device having a larger than 10 inch-sized display area, the batch exposure technique is useless due to the diffraction of light incident from an exposure apparatus.

Referring to the FIG. 3 illustrating the step-and-repeat exposure technique, the display area is formed into a plurality of neighboring display exposure regions like A1, A2, . . . , A9, sequentially. Each of the display exposure regions has an identical image projected onto itself with a same display patterning mask.

By the same technique, the data pad portions are formed into a plurality of neighboring data exposure regions like D1, D2, D3 and E1, E2 E3 having an identical image, sequentially. And the gate pad portions are formed into a plurality of neighboring gate exposure regions like B1, B2, B3, C1, C2 and C3 having an identical image, sequentially.

The above-mentioned step-and-repeat exposure technique is more widely used than the batch exposure technique as an exposure method.

But, to fabricate the liquid crystal display device using the step-and-repeat exposure technique may give rise to a serious degradation of image quality at the display area. The reason is that the step-and-repeat exposure technique needs at least over 40 processes of photolithography. Comparing with the step-and-repeat exposure technique, the batch technique needs at least just 5 processes of photolithography. Thus, no matter bow accurate exposure equipment and arrangement apparatus are used for the step-and-repeat exposure technique, it may give rise to misalignment between the exposure regions.

For example, as shown in FIG. 4, the display exposure regions A7 and A8, the display exposure region A7 includes a pixel electrode 71, a half of a data line 60, and a half of a data line 61. The display exposure region A8 includes a pixel electrode 72, a half of a data line 61, and a half of a data line 62. The display exposure regions A7 and A8 include the data line 61 in common, and are divided by an imaginary boundary line 50. That is to say, the display exposure regions A7 and A8 differ in an exposed order with the imaginary boundary line 50 centering on between the display exposure regions A7 and A8. That difference in the exposed order may bring out a difference in distances between the pixel electrodes 71 and 72 and the data lines 60, 61 and 62. Since the exposure equipment or the arrangement apparatus has an accuracy limitation of itself, misalignment between the exposure regions may occur. The misalignment may result in shift, rotation and distortion of the patterns, thereby causing defects such as disconnection of the wirings and differences in electrical properties between the exposure regions.

Namely, the distance between the pixel electrode 71 and the data line 60 is different from the distance between the pixel electrode 71 and the data line 61. And, the distance between the pixel electrode 72 and the data line 61 is different from the distance between the pixel electrode 72 and the data line 62. The pixel electrodes 71 and 72 are the pixel portions P1 and P2, respectively.

In other words, fabricating the thin film transistor by the step-and-repeat exposure technique, it may bring about spotted effects near the boundaries of the neighboring display exposure regions resulted from the sudden difference in the distance between the pixel electrodes and the data lines at each exposure region.

In case of manufacturing the large-sized liquid crystal display device using the step-and-repeat exposure technique, driving the liquid crystal display device by a dot inversion method, it brings about the difference in parasitic capacitance Cdp between the data line and the right and left pixel electrodes between exposure regions. The parasitic capacitance Cdp is the critical factor directly affecting the brightness of the display area. Thus, the difference in the parasitic capacitance Cdp brings about the difference in the brightness between the left pixel electrode and the right pixel electrode with the center boundary line differentiating the left pixel electrode and the right pixel electrode. Namely, the detectable difference in brightness, or the spotted effect occurs near the boundaries of the exposure regions.

SUMMARY OF THE INVENTION

It is therefore an object of the present invention to reduce the detectable difference in brightness resulting from the difference in distance between pixel electrodes and data lines at the boundaries of exposure regions for a liquid crystal display device having a larger display area.

For the above object, in a preferred embodiment of the present invention, a method of manufacturing a liquid crystal display device, including depositing a first metal layer on a transparent substrate; patterning the metal layer to form a gate line, the gate line having a gate electrode portion; depositing sequentially an insulating layer, an amorphous silicon layer and a doped amorphous silicon layer on the exposed surface of the transparent substrate while covering the gate line; patterning the amorphous silicon layer and the doped amorphous silicon layer to form a semiconductor island; depositing a second metal layer on the exposed surface or the insulating layer while covering the semiconductor island; patterning the second metal layer to form a source electrode, a drain electrode, and a capacitor electrode, the drain electrode spaced apart from the source electrode; etching the doped amorphous silicon layer of the semiconductor island to from an active area; forming a passivation film over the whole surface of the substrate while covering the source electrode, the drain electrode and the capacitor electrode; depositing a transparent conductive material layer an the passivation film; applying a negative photoresist on the transparent conductive material layer; performing a back side exposure to form a first exposed portion of the negative photoresist; aligning a patterning mask with the negative photoresist; performing a front side exposure to form a second exposed portion of the negative photoresist, the second exposed portion overlapping the first exposed portion; baking the transparent conductive material layer; and patterning the transparent conductive material layer to form a pixel electrode.

The gate line further includes first and second light shielding portion, the gate electrode portion interposed the first and second light shielding portions, the first and second light shielding portions extended outward a direction perpendicular to the gate line. An overlapped portion that the first exposed portion overlaps the second exposed portion is about 2 μm to about 4 μm in width A temperature of baking the transparent conductive material layer is about 100° C. to about 150° C.

In another aspect, a liquid crystal display device includes a display area including gate lines, data lines, and thin film transistors, the gate lines arranged in a direction, the data lines arranged a direction perpendicular to the gate lines, the thin film transistors arranged near cross points of the gate lines and the data lines; a gate pad portion having a plurality of gate pads, each of the plurality of the gate pads connected with the corresponding gate lines; a data pad portion having a plurality of data pads each of the plurality of the data pads connected with the corresponding data lines; and a plurality of light shielding patterns arranged along and outside edges of the display area, the light shielding patterns preventing light from transmitting portions other than the display area and the gate and data pad portions.

The light shielding patterns are made of an opaque material. The light shielding patterns are selected from a group consisting of chromium (Cr), aluminum (Al), antimony (Sb), tungsten (W), tantalum (Ta), molybdenum (Mo) and amorphous silicon. The light shielding patterns includes two gate light shielding patterns and two data light shielding patterns, the two gate light shielding patterns arranged in a direction parallel to the data lines and spaced apart from each other with the display area therebetween, the two data light shielding patterns arranged in a direction parallel to the gate lines and spaced apart from each other with the display area therebetween. The light shielding patterns including a plurality of light shielding patterns, the plurality of the light shielding patterns spaced apart from each other, both end portions of each of the plurality of the light shielding patterns overlapping a portion of the gate lines or the data lines.

In another aspect, a method of fabricating an array substrate of a liquid crystal display device including a transparent substrate and a plurality of gate and data pads, the method includes forming a plurality of gate lines and a plurality of gate pads, the plurality of the gate lines arranged in a direction, each of the gate pads connecting with the corresponding gate line outside the display area by a step-and-repeat exposure technique with a front-side exposure; forming data light shielding patterns parallel to the gate lines between pre-positions of the data pads and the display area; forming a plurality of data lines and data pads, the plurality of the data lines arranged a direction perpendicular to the gate lines, each of the data pads connecting with the corresponding data line outside the display area by the step-and-repeat exposure technique with the front-side exposure; forming gate light shielding patterns parallel to the data lines between the gate pads and the display area; forming a thin film transistor arranged near cross portion of the gate and data lines, the thin film transistor having a gate electrode, a source electrode and a drain electrode; depositing a transparent conductive layer and applying a negative-photoresist on the transparent substrate having the thin film transistors; forming a first exposed portion of the negative-photoresist by back-side exposure using the gate and data lines and the gate and data light shielding patters as a mask; forming a second portion of the negative-photoresist using a step-and-repeat exposure by a front-side exposure; backing the transparent conductive layer; and etching the transparent conductive layer to form a pixel electrode.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiment of the present invention, example of which is illustrated in the accompanying drawings.

Figure 1:
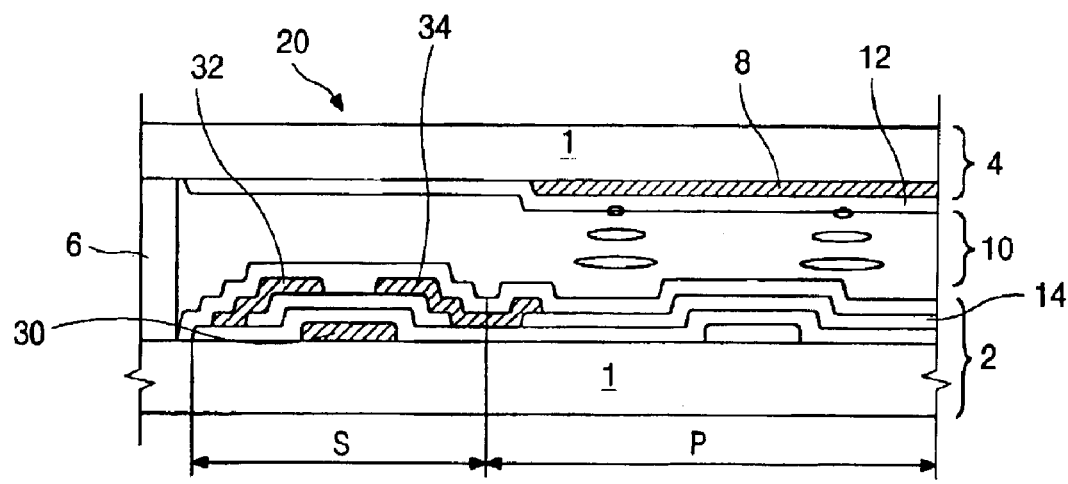
FIG. 1 is a cross-sectional view illustrating a pixel of a conventional liquid crystal display device.
Figure 2:
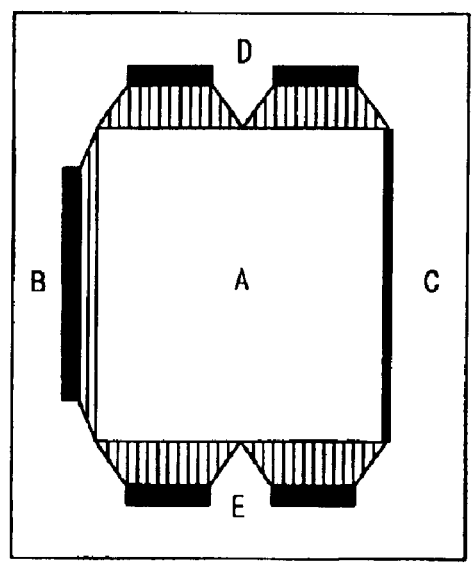
FIG. 2 is a plan view illustrating a patterning mask of the conventional liquid crystal display device.
Figure 3:
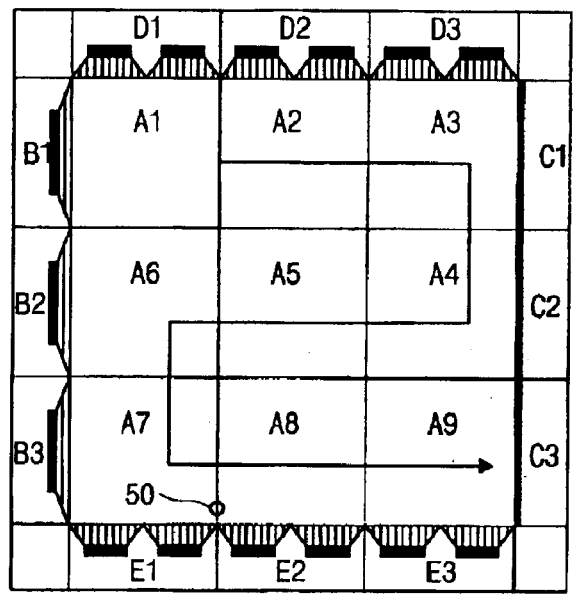
FIG. 3 is a plan view illustrating a typical step-and-repeat exposure technique applied to a larger display area.
Figure 4:
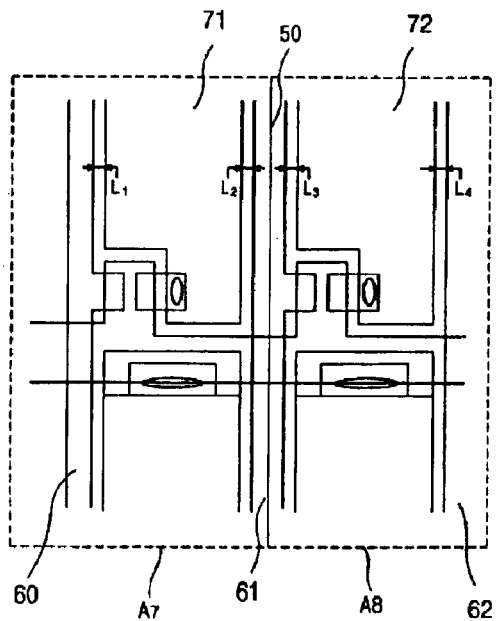
FIG. 4 is an expanded plan view illustrating exposure regions produced by the conventional step-and-repeat exposure technique.
Figure 5:
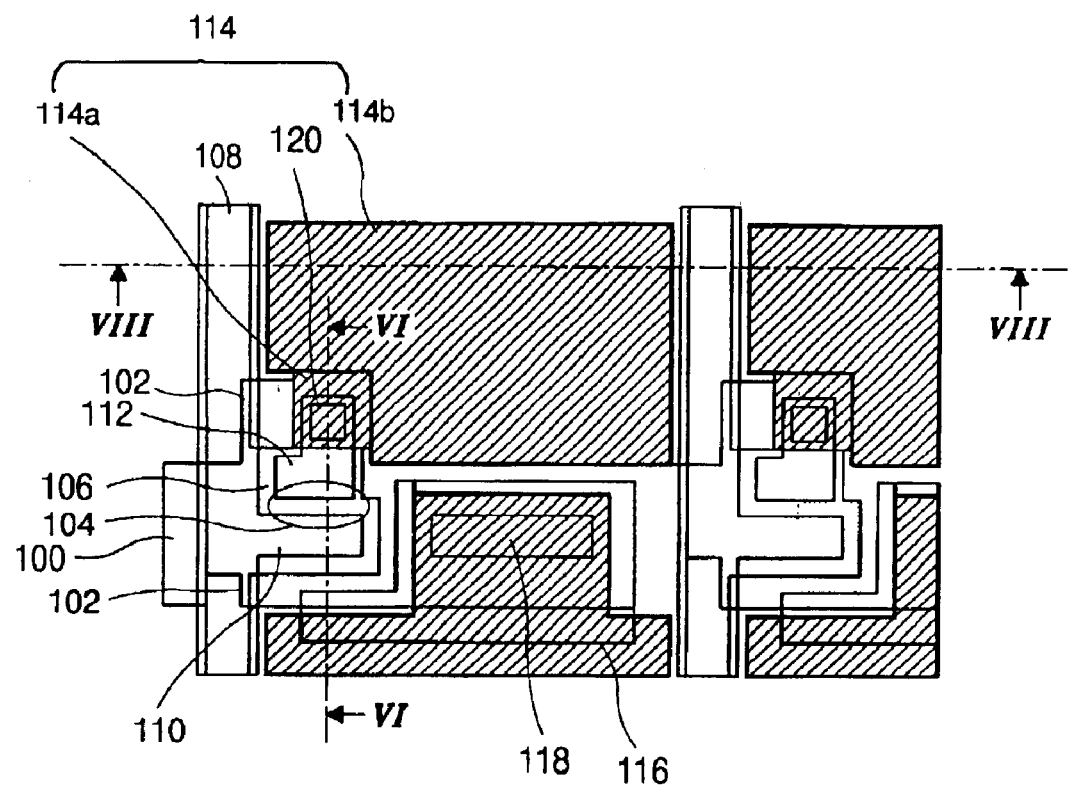
FIG. 5 is a partially expanded plan view illustrating a pixel of a liquid crystal display device according to a preferred embodiment of the present invention.

FIG. 5 is a partially expanded plan view illustrating a pixel of a liquid crystal display (LCD) device according to a preferred embodiment of the present invention.

For the sake of convenience in explanation, describing the construction of the pixel regardless of process orders, the pixel includes a gate line 100 arranged in a transverse direction, a data line 108 arranged in a longitudinal direction perpendicular to the gate line 100, pixel electrodes 114 disposed between a pair of the data lines 108 and the gate line 100, and a thin film transistor (TFT) arranged near the cross point of the gate and data lines 100 and 108. The TFT includes a gate electrode 106, a source electrode 110 and a drain electrode 112.

The gate line 100 includes a gate electrode 106, and light shielding portions 102 perpendicularly extended upward and downward from the gate line 100.

A data line 108 perpendicular to the gate line 100 has a drain electrode 110 formed at a side portion and a source electrode 112 formed opposite to the drain electrode 110. The drain electrode 110 is electrically connected with the pixel electrode 114 via a drain contact hole 120.

The pixel includes a storage electrode 116 formed over the gate line 100. The storage electrode 116 is electrically connected with the corresponding pixel electrode 114 via a storage contact hole 118.

Figure 6:
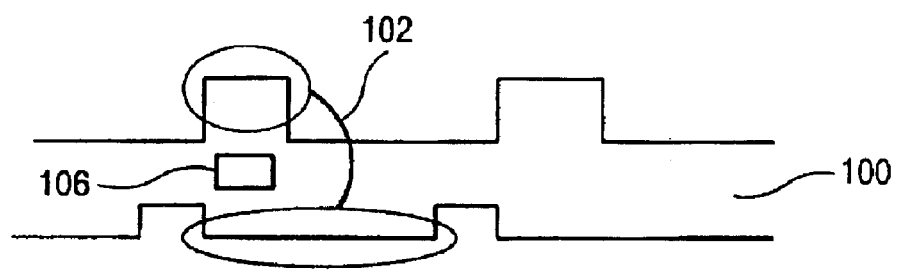
FIG. 6 is an expanded plan view illustrating a gate line according to the preferred embodiment according to the present invention.

FIG. 6 is an expanded plan view of a gate line of the liquid crystal display device according to the preferred embodiment of the present invention.

Shown in the FIG. 6 and described in FIG. 5, the gate line 100 includes a gate electrode 106, and light shielding portions 102 perpendicularly extended upward and downward from the gate line 100 and located near the gate electrode 106.

A major role of the light shielding portions 102 is to prevent UV light from irradiating to a channel 104 of a thin film transistor during a later process of forming a pixel electrode, i.e., the back-side exposure, together with the gate line 100.

Figure 7A:
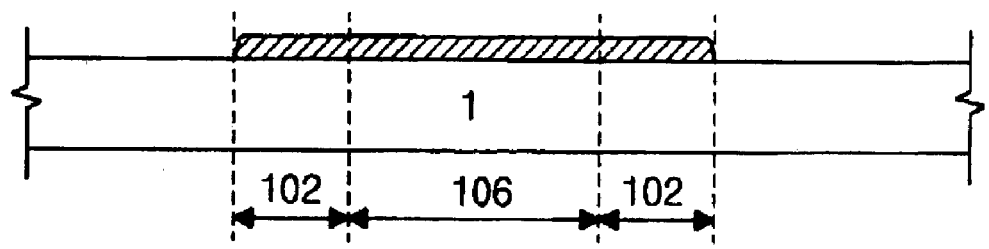
FIGS. 7A to 7F are cross-sectional views taken along a section line VII–VII of FIG. 5 respectively illustrating each process of manufacturing the liquid crystal display device according to the preferred embodiment of the present invention.
Figure 7B:
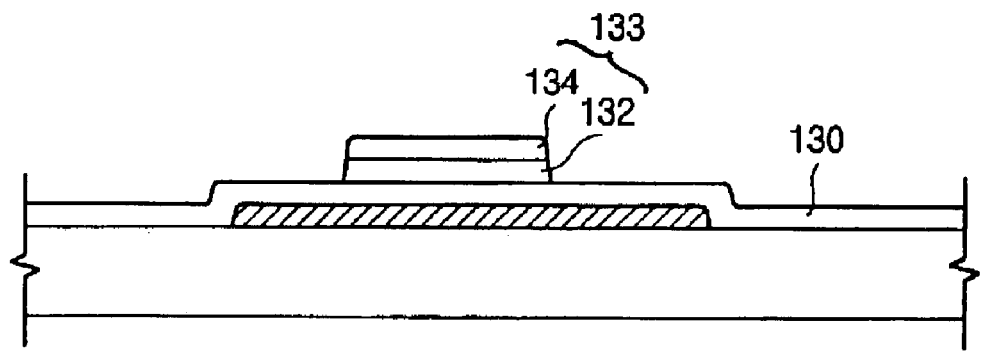

FIGS. 7A to 7F are cross sectional views taken along line VII–VII of FIG. 5, illustrating a process for manufacturing the LCD device. As shown in FIG. 7A, a metal layer is deposited on a transparent substrate 1 and patterned so as to form the gate electrode 106 and the light shielding portions 102. The metal layer preferably employs a dual-layered structure of Molybdenum (Mo) and Aluminum-Neodymium (AlNd). Then, as shown in FIG. 7B, an insulating layer, an amorphous silicon layer 132 and a doped amorphous silicon layer 134 are deposited sequentially and patterned so as to form a gate insulator 130 and an amorphous silicon amorphous silicon island 133.

Figure 7C:
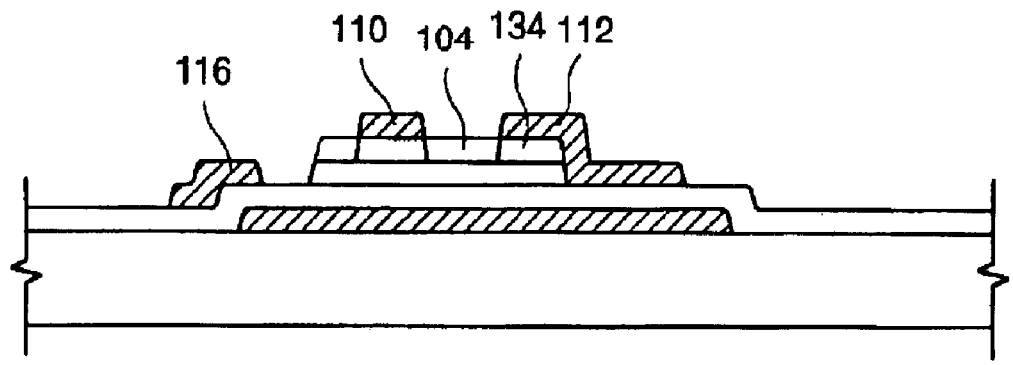

Third, shown in FIG. 7C, a metal layer is deposited and patterned so as to form the source electrode 110, the drain electrode 112 and the storage electrode 116. After that, the channel 104 is formed by etching the doped amorphous silicon layer 134 using the source electrode 110, the drain electrode 112 and the storage electrode 116 as a mask.

Hereinafter, the amorphous silicon island 133 can play a role as an active layer, since the amorphous silicon island 133 does not include the doped amorphous silicon in the channel 104.

In other words, if not etching the channel 104, the amorphous silicon island 133 can not play a role as a switching element because it has no on/off characteristic.

Figure 7D:
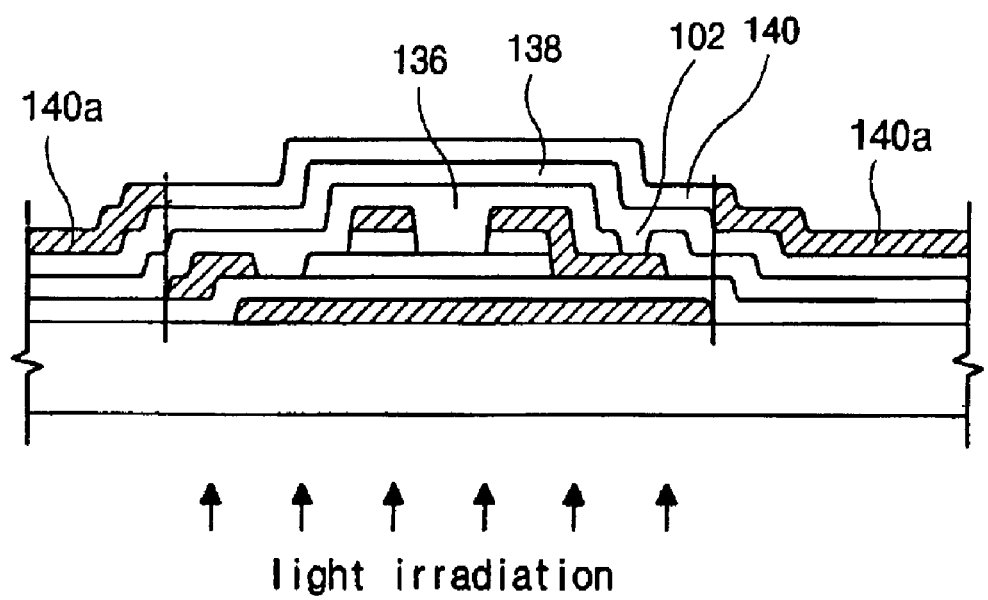

Next, as shown in FIG. 7D, a passivation film 136 is deposited over the whole surface of the substrate 1 while covering the source and drain electrodes 110 and 112. A portion of the passivation film 136 on the drain electrode 112 is etched to form the drain contact hole 103. After forming the drain contact holes 102, a transparent conductive electrode 138 is deposited on the passivation film 136, and then, a negative-photoresist 140 is applied on the transparent conductive layer 138. The negative-photoresist 140 has a characteristic that a portion of, for example, the transparent conductive electrode that is not exposed to light is etched away.

In the preferred embodiment of the present invention, the pixel electrode 114 is formed by a self-aligning technology using the negative-photoresist 140. That is to say, in order to form the pixel electrode 114, the array substrate 1 is subjected to both a front-side exposure and a back-side exposure. More specifically, when light is shone from below the transparent substrate 1 for the back-side exposure, the patterned gate electrode 106 acts as a mask, and when light is shone from above the transparent substrate 1 for the front-side exposure, the separate patterning mask is used.

After applying the negative-photoresist 140 on the transparent conductive electrode, as explained above, light is shone from below the transparent substrate 1 so as to form a first exposed portion 140a of the negative-photoresist 140.

Figure 7E:
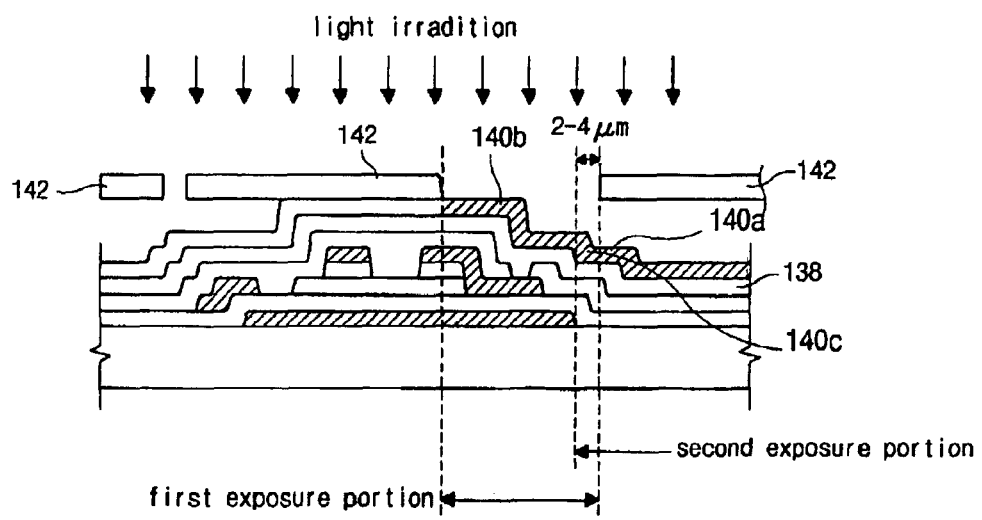
Figure 7F:
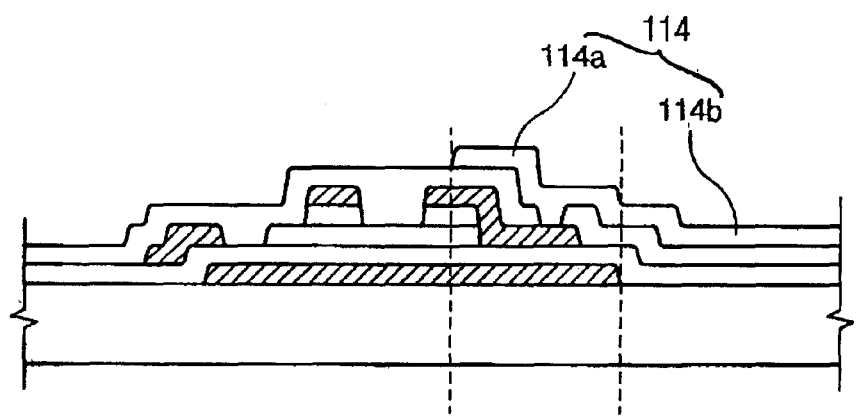

Next, shown in FIG. 7E, after aligning a patterning mask 142 over the negative-photoresist 140, UV light is illuminated from above the pattern mask 142 so as to form a second exposed portion 104b of the negative-photoresist 140. At this point, it is preferred that a little overlap 140c exists between the first exposed portion 140a and the second exposed portion 140b in order to prevent a possible open of the transparent conductive electrode 138 at a position corresponding to a boundary between the first exposed portion 140a and the second exposed portion 140b in a later etching process. The width of the overlap 140c is preferably about 2 μm to about 4 μm. After the front-side exposure, the negative-photoresist 140 is baked and etched to form the pixel electrode 114 as shown in FIG. 7F. The post exposure baking (PEB) temperature is preferably between about 100° C. and about 150° C.

The pixel electrode 114 includes a first pixel portion 114a produced by the back-side exposure and a second pixel portion 114b produced by the front-side exposure.

The preferred embodiment of the present invention may be summarized as follows: forming the gate electrode (a first step); forming a semiconductor area (a second step); forming the source and drain electrodes (a third step); forming the passivation film (a fourth step); and forming the pixel electrode (a fifth step). The preferred embodiment of the present invention, except for the fifth step of forming the pixel electrode 114, the step-and-repeat exposure technique with the front-side exposure is basically employed for patterning. For the step of forming the pixel electrode 114, the self-aligning technique with the back-side exposure and the step-and-repeat exposure technique with the front-side exposure are used together in order to prevent the difference in brightness resulting from the misalignment between the data lines and the pixel electrodes, which may occur only when using the step-and-repeat exposure technique. That is to say, by using the self-aligning technique with the back-side exposure and the step-and-repeat exposure technique with the front-side exposure together for forming the first pixel portion of the pixel electrode, the possible spotted effects on the display area of the liquid crystal display device produced when using only the step-and-repeat exposure technique can be excluded. Further, the problem of using only the batch technique and resulting from the refraction of light can be excluded by applying the step-and-repeat exposure technique to forming the second pixel portion of the pixel electrode which is much more delicate than the first pixel portion.

Figure 8:
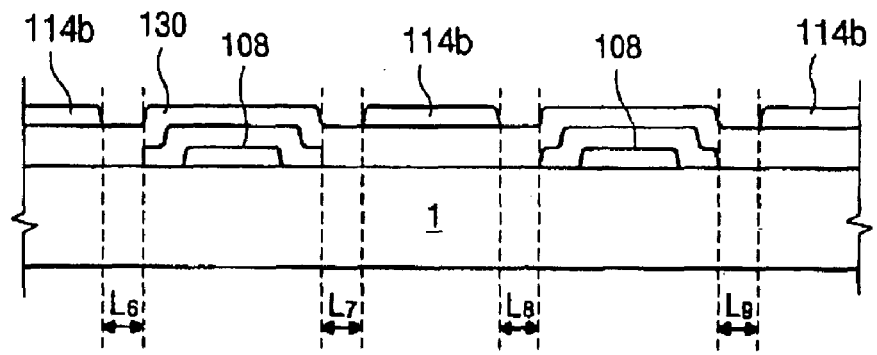
FIG. 8 is a cross-sectional view taken along line VIII–VIII of FIG. 5.

The above advantage is explained in detail referring to FIG. 8 showing a cross-sectional view taken along line VIII–VIII of FIG. 5. Shown in FIG. 8, the data lines 108 are formed on the transparent substrate 1, and the insulating layer 130 is formed on the data lines 108. Between the adjacent two data lines 108, the second pixel portion 114b of the pixel electrode 114 is formed on the insulating layer 130. The first pixel portion 114a of the pixel electrode 114 is not shown in this cross-sectional view. The data lines 108 are at a distance of L6, L7, L8 and L9 from the adjacent pixel portion 114b, respectively.

All of the spaced distances L6, L7, L8 and L9 are almost same because the pixel portions 114b of the pixel electrode 114 are formed by the batch exposure technique with the back-side exposure described in FIG. 7D. The width of the spaced distance can be controlled, and is preferably around 1 μm.

In the preferred embodiment of the present invention, the negative-photoresist 140 is used to form the pixel electrode 114. The pixel electrode 114 is formed only on the display area. Since the negative-photoresist 140 has a characteristic that a portion of for example, a transparent conductive electrode that is not exposed to light is etched away, it is preferred that separate light-shielding patterns are formed alogn and outside the display area for UV light to be irradiated only to the display area during the back side exposure so as not to leave useless transparent conductive portions which has the same material as the pixel electrode 114.

Figure 9:
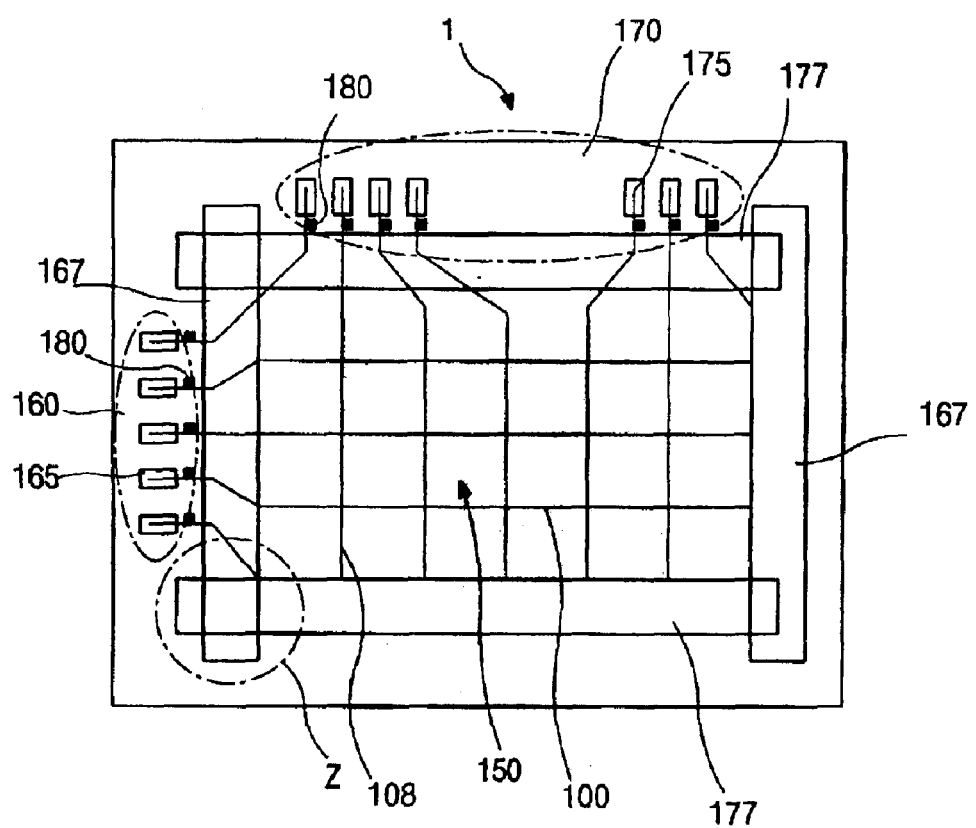
FIG. 9 is a plan view illustrating a thin film transistor substrate according to the preferred embodiment of the present invention.

FIG. 9 shows the TFT array substrate of the liquid crystal display device according to the preferred embodiment of the present invention. As shown in FIG. 9, the array substrate 2 has a display area 150, a gate pad portion 160 including a plurality of gate pads 165 and a data pad portion 170 including a plurality of data pads 175. Each of the gate pads 165 is connected to the corresponding gate line 100, and each of the data pads 175 is connected to the corresponding data line 108. The gate pad portion 160 and the data pad portion 170 are formed along two adjacent sides of the display area 150, respectively.

The TFT array substrate 2 further includes a plurality of static electricity protection portions 180. The static electricity protection portion 180 is formed between the pad and the corresponding gate or date line. The static electricity protection portions 180 serve to prevent a static electricity, which may be produced in a process of manufacturing the TFT array substrate 2, from destroying the insulation of the thin film transistors.

As described above, for forming the pixel electrode 114 of the liquid crystal display device according to the present invention, the negative-photoresist 140 is used. Thus, light-shielding patterns are necessary to be formed along and outside edges of the display area 150 during the back-side exposure in order to illuminate light both the display area and the pad areas.

For the light-shielding patterns, the two gate light shielding patterns 177 are formed along an outside the display device 150. The two gate light shielding patterns 177 are spaced apart from each other with the display area 150 therebetween. The two data shielding patterns 167 are along an outside the display device 150. The two data light shielding patterns 167 are spaced apart from each other with the display area 150 therebetween. The gate and data light shielding patterns are perpendicular to each other. Preferably, the gate and data light shielding patterns constructs a rectangular shape and are electronically connected with each other to form a equipotential. The light gate shielding pattern 177 and the data shielding pattern 167 are made of a light-reflecting or absorbing material such as metal, amorphous silicon or black resin.

Figure 10:
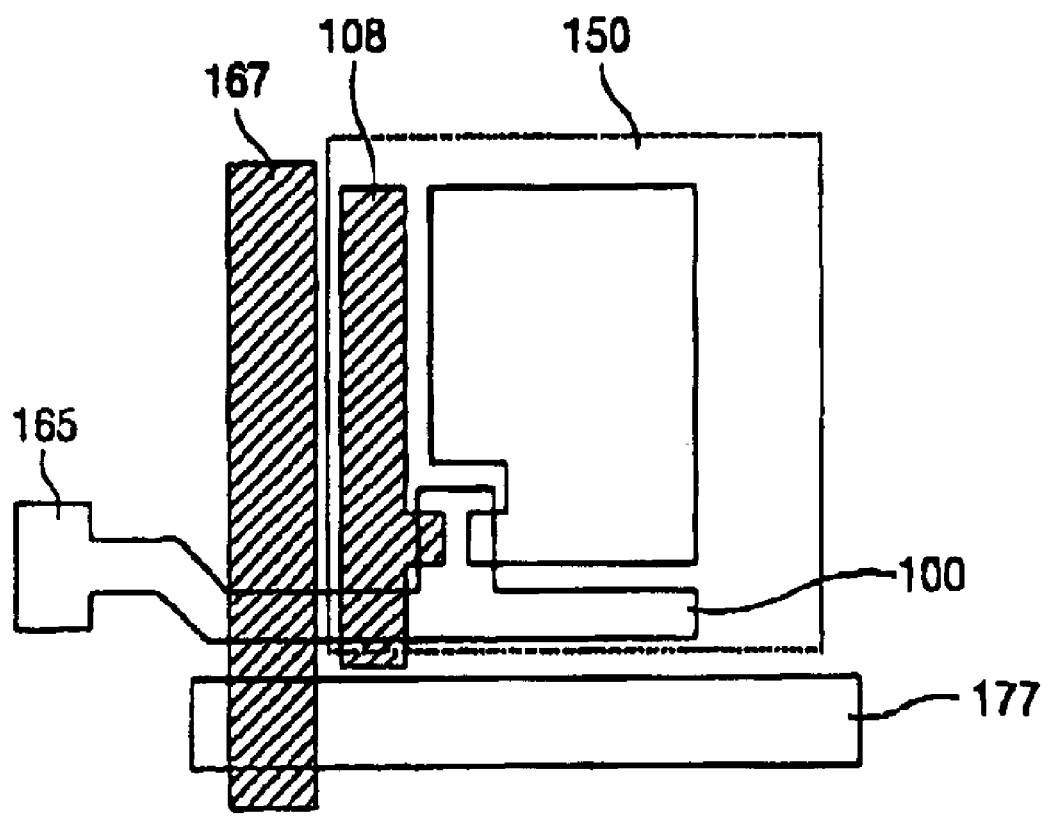
FIG. 10 is an expanded plan view illustrating a portion "Z" of FIG. 9.

FIG. 10 is an expanded plan view of "Z" portion in FIG. 9. As shown, FIG. 10, the gate and data light shielding patterns 177 and 167 are formed along and outside the display area 150, respectively. The gate light shielding patterns 177 are arranged in a direction parallel to the gate lines 100, spaced apart from each other with the display area 150 therebetween. The data light shielding patterns 167 are arranged in a direction parallel to the gate lines 100, spaced apart from each other with the display area 150 therebetween. The gate light shielding patterns 177 and the gate lines 100 are formed at the same time, and the data shielding patterns 167 and the data lines 108 are formed at the same time. Thus, an additional process is not required.

The gate and data shielding patterns 177 and 167 are formed electrically independent of the gate and data lines 100 and 108. Namely, the gate shielding pattern 177 is electrically independent of the gate line 100, and the data shielding pattern 167 is electrically independent of the data line 108. The width of both the gate and data light shielding patterns 177 and 167 is preferably between about 50 μm and about 500 μm.

Figure 11:
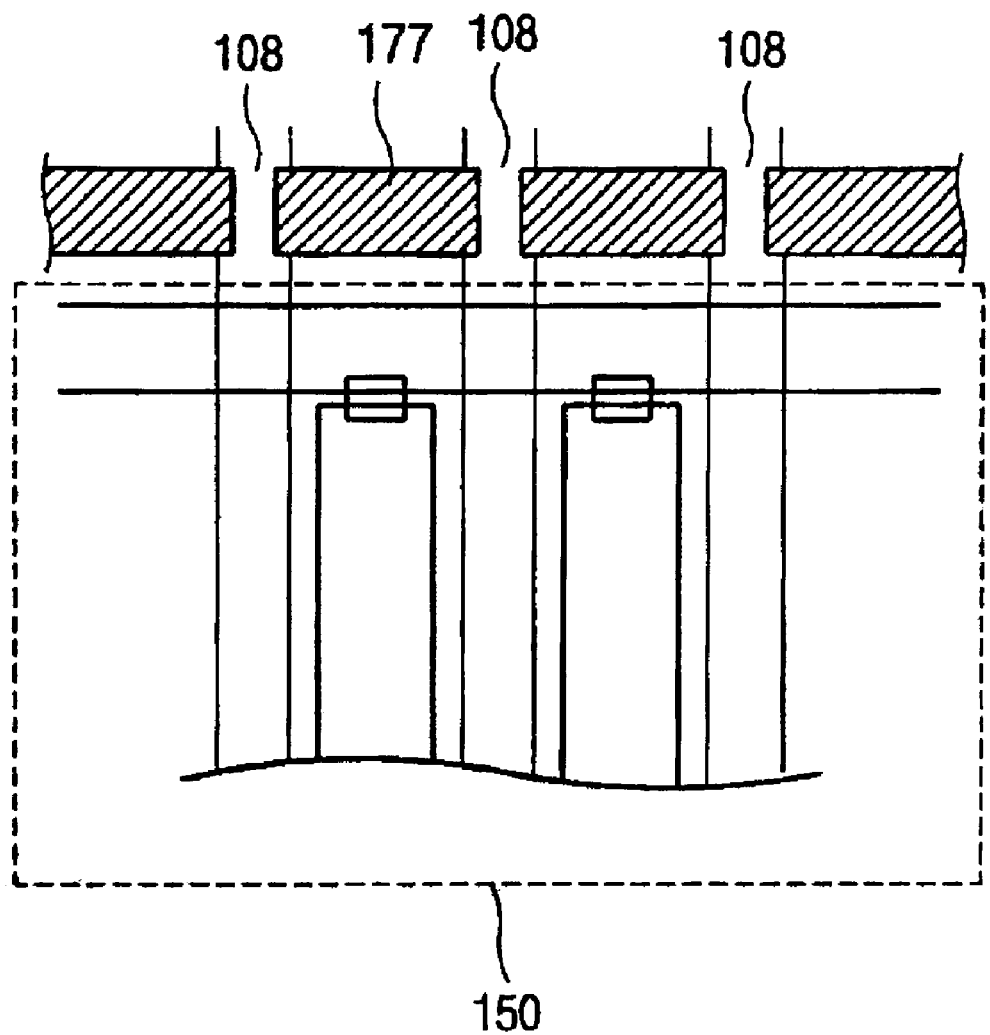
FIG. 11 is an expanded plan view illustrating a modified light shielding pattern according to the preferred embodiment of the present invention.

FIG. 11 is an expanded plan view illustrating a modified light shielding pattern. As shown in FIG. 11, a plurality of data light shielding patterns 167 are formed along and outside the display area 150, and spaced apart from each other. Even though not shown, the gate light shielding patterns 177 are also formed along and outside the display area 150, and spaced apart from each other. Preferably, both end portions of each of the gate and data light shielding patterns 177 and 167 overlap the data and gate lines 108 and 100, respectively.

As described above, in case of using the negative photoresist, the light shielding pattern serves to prevent UV light from transmitting portions other than the display area in other words, when the pixel electrode is formed by a self-aligning technique including the back-side exposure using the negative photoresist, it is prevented to employ the light-shielding patterns between the display area and the gate and data pad portions so that the transparent conductive material used as the pixel electrode is not formed on areas other than the display area.

As described herein-before, by manufacturing the LCD device according to the preferred embodiment of the present invention, since display distortion such as a difference in brightness can be removed, display quality can be improved.

While the invention has been particularly shown and described with reference to preferred embodiments thereof, it will be understood by those skilled in the art that the foregoing and other changes in fort and details may be made therein without departing from the spirit and scope of the invention.

What is claimed is:

1. A liquid crystal display device having upper and lower substrates, comprising:
 a display area including gate lines, data lines, and thin film transistors, the gate lines arranged in a direction, the data lines arranged a direction perpendicular to the gate lines, the thin film transistors arranged near cross points of the gate lines and the data lines, wherein the gate and data lines are formed on the lower substrate;
 a gate pad portion having a plurality of gate pads, each of the plurality of the gate pads connected with the corresponding gate lines;
 a data pad portion having a plurality of data pads, each of the plurality of the data pads connected with the corresponding data lines; and
 a gate light shielding pattern formed at the same time as the gate lines and a data light shielding pattern formed at the same time as the data lines, and the gate and data light shielding patterns are between outside edges of the display area and the gate and data pad portions on the lower substrate, and, the gate and data light shielding patterns blocking light during a back-side exposure.

2. The liquid crystal display device of claim 1, wherein the gate and data light shielding patterns are made of an opaque material.

3. The liquid crystal display device of claim 1, wherein the gate and data light shielding patterns are selected from a group consisting of chromium (Cr), aluminum (Al), antimony (Sb), tungsten (W), tantalum (Ta), molybdenum (Mo) and amorphous silicon.

4. The liquid crystal display device of claim 1, wherein the gate and data light shielding patterns includes two gate light shielding patterns and two data light shielding patterns, the two gate light shielding patterns arranged in a direction parallel to the data lines and spaced from each other with the display area therebetween, the two data light shielding patterns arranged in a direction parallel to the gate lines and spaced apart from each other with the display area therebetween.

5. The liquid crystal display device of claim 1, wherein the gate and data light shielding patterns include a plurality of gate and data light shielding patterns, the plurality of the gate and data light shielding patterns spaced apart from each other, both end portions of each of the plurality of the gate light shielding patterns overlapping a portion of the gate lines and both end portions of each of the plurality of the data light shielding patterns overlapping a portion of the data lines.

* * * * *